3,322,777
ETHYL 2,2-DIMETHYL-3-(4-n-NONYLPIPERIDI-
NO)CARBONYL CYCLOBUTANO ACETATE
Evald L. Skau, Robert R. Mod, and Frank C. Magne,
New Orleans, La., assignors to the United States of
America as represented by the Secretary of Agriculture
No Drawing. Original application Feb. 5, 1964, Ser. No.
354,190, now Patent No. 3,222,203, dated Dec. 7, 1965.
Divided and this application June 1, 1964, Ser. No.
396,449
1 Claim. (Cl. 260—294.3)

This application is a division of Ser. No. 354,190, filed Feb. 5, 1964, now U.S. Patent No. 3,222,203, which is a continuation-in-part of Ser. No. 260,923, filed Feb. 25, 1963, now U.S. Patent No. 3,219,612.

A non-exclusive, irrevocable, royalty-free license in the invention herein described, throughout the world for all purposes of the United States Government, with the power to grant sublicenses for such purposes, is hereby granted to the Government of the United States of America.

This invention relates to ethyl 2,2-dimethyl-3-(4-n-nonylpiperidino) carbonylcyclobutaneacetate, which compound is useful as a solvent-type plasticizer for vinyl chloride resins.

We have discovered that the compound that is the subject of this invention is a good, compatible, solvent-type plasticizer for vinyl chloride resins which exihibits good compatibility with and impart low volatility loss, resistance to microbial action, excellent low temperature properties, and stability to northern light exposure to polymer and copolymer resins of vinyl chloride.

The terms "vinyl type resin" and "vinyl chloride resin" are used throughout this specification and claim to refer to polymers and copolymers of monomers containing vinyl chloride in a predominant proportion by weight. Terms such as "compatible," "good compatibility," and "compatible plasticizer" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

If a resin is plasticized with a compound with which it has only limited compatability, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to that which is the subject of this invention exhibit reasonably good compatibility for hydrophilic type resins but in order to obtain adequate flexibility must be employed together with a secondary or an auxiliary plasticizer as see for example United States Patent No. 2,339,056.

It would be expected from the recognized compatibility of compounds related to the type herein described with polyvinyl acetals (hydrophilic type resins), that these compounds would be quite incompatible with polymers of the viny chloride type. We have discovered, however, that not only is the particular compound herein described compatible as primary plasticizers with vinyl chloride resins but as we note above it is compatible with the hydrophilic type resins as well.

Also included among the operable N-acyl cyclic imines are those whose acyls are acyls such as the acyls of the following types of acids: tall oil acids; rosin-derived or terpene-derived acids such as abietic, l-pimaric, pinonic and the gamma-lectone of beta-hydroxyisopropyl pimelic acid.

Also included among the operable N-acyl derivatives of this invention are the acyl derivatives of 3- to 7- membered substituted cyclic imines in which the substituents may include alkyl, aralkyl, aryl, hydroxy, acyloxy, alkoxyalkyl, cyano, cyanoalkyl, alkoxy, ester, or carbalkoxy groups or the like.

The compounds of the instant invention were tested for vinyl chloride-vinyl acetate (95–5) copolymer resin Vinylite (VYDR) and in polyvinylchloride (Geon 101) in a standard formulation comprising: 63.5% of Vinylite VYDR or Geon 101, 35% plasticizer, 0.5% stearic acid, and 1.0% basic lead carbonate. This formulation for each sample was milled, molded, and tested. In all examples, the sample was rated as incompatible if the molded stock showed any evidence of exudation or migration to the surface during a shelf storage of two weeks.

The compounds that are the subject of this invention are conveniently prepared by reacting the appropriate imine, which in every case is a cyclic imine wherein the nitrogen atom is a member of either the ring or a member of one of the rings if a fused ring compound is involved, with the appropriate acid, acid chloride, or ester. In any event, methods for preparing compounds such as those herein described are well known to those skilled in the art of fatty acid chemistry. The details of individual preparations are listed in the operating examples which follow:

*Example 1*

N-Oleoylpiperidine. — Twenty-two and four tenths grams (0.26) mole) of piperidine were dissolved in 60 milliliters of benzene and 39.7 grams (0.13 mole) of oleoyl chloride were added dropwise with stirring. After stirring for an additional hour, the reaction mixture was filtered, washed successively with dilute hydrochloric acid and water, and dried over anhydrous sodium sulfate. Free acid was removed by perculating the benzene solution through a column of activated alumina and eluting the amide with a 1:1 ethanol-benzene mixture. The solvent was then removed by stripping under reduced pressure. Analysis of the product, N-oleoylpiperidine: percent C, 78.15 (theory 78.95); percent H, 12.07 (theory 12.40); percent N, 4.04 (theory 4.04).

When N-oleoylpiperidine was compounded with the vinyl chloride-vinyl acetate copolymer and also with the polyvinyl chloride homopolymer, as described above, the respective plastic compositions had the properties shown in Table I.

The piperidide of Example 1 was also evaluated as a nitrile rubber (Hycar 1042–33% acrylonitrile) softener. The formulation employed was as follows:

|  | Percent | Parts/100 parts of rubber |
|---|---|---|
| Nitrile rubber (33% acrylonitrile) | 52.8 | |
| SFR black | 31.7 | 60.0 |
| Zinc oxide | 2.6 | 5.0 |
| Stearic acid | 0.79 | 1.5 |
| Sulfur | 0.79 | 1.5 |
| Accelerator | 0.79 | 1.5 |
| Softener | 10.6 | 20.0 |

The composition was cured for 30 minutes at 310° F. It showed no signs of exudation in 15 days. The evaluation results are given in Table II which also includes the results for the control, dibutylsebacate (DBS).

TABLE I

| Example No. | Plasticizer | Tensile strength, p.s.i. | 100% modulus, p.s.i. | Elongation, percent | Brittle point, °C. | Volatility loss, percent | Compatibility [a] |
|---|---|---|---|---|---|---|---|
| 1 | N-oleoylpiperidine [c] | 2,670 | 1,170 | 390 | −47 | 1.18 | C |
| 1 | ----do [b] | 2,990 | 1,400 | 330 | −41 |  | C |

[a] C=Compatible, I=Incompatible.
[b] Using poly(vinyl chloride) homopolymer instead of Vinylite VYDR resin.
[c] Using Vinylite VYDR resin.

TABLE II

| Example No. | 300% Modulus, p.s.i. | | Tensile strength, p.s.i. | | Ultimate elongation, percent | | Hardness, Shore A | Brittle point, °C. | Volatility, percent | Swelling, percent |
|---|---|---|---|---|---|---|---|---|---|---|
|  | Unaged | Aged | Unaged | Aged | Unaged | Aged |  |  |  |  |
| 1 | 600 | 990 | 1,940 | 2,140 | 710 | 510 | 50 | −48 | 0.52 | 22.2 |
| IBS (control) | 960 | 1,920 | 2,170 | 2,350 | 580 | 370 | 55 | −55 | 5.52 | 20.9 |

Samples of Vinylite VYDR resin plasticized with the N-oleoylpiperidine of Example 1 were subjected to standard soil-burial tests using similar samples of VYDR resin plasticized with N-oleoylmorpholine as controls. After 29 days localized areas of discoloration, indicating microbial attack, appeared in the control. None of the other specimens showed any signs of discoloration after 56 days.

Improved light stability and thermal stability can be attained by inclusion of suitable stabilizers and/or antioxidants in the resin-plasticizer formulation.

The soapy water extractability can be reduced by the use of additives such as hydrocarbon extenders.

*Example 2*

*Ethyl 2,2-dimethyl-3-(4-n-nonylpiperidino)carbonylcyclobutaneacetate.*—Ethyl 2,2-dimethyl-3-(4-n-nonylpiperidino)carbonylcyclobutaneacetate was prepared by the procedure of Example 1 from 27.3 grams (0.13 mole) of 4-n-nonylpiperidine, 30 grams (0.13 mole) of ethyl 2,2-dimethyl-3-chlorocarbonylcyclobutaneacetate, and 10.2 grams (0.13 mole) of pyridine. Analysis of the product, percent C, 72.75 (theory 73.64); percent H, 11.09 (theory 11.13); percent N, 3.41 (theory 3.44).

A sample of Vinylite VYDR resin, plasticized with ethyl 2,2 - dimethyl - 3 - (4 - n - nonylpiperidino)carbonylcyclobutane acetate had a tensile strength (p.s.i.) of 3180, a 100% modulus (p.s.i.) of 1860, and elongation of 320%, and a brittle point of −1° C.

We claim:

Ethyl 2,2 - dimethyl - 3 - (4 - n - nonylpiperidino)carbonylcyclobutanoacetate.

References Cited

UNITED STATES PATENTS

| 3,031,499 | 4/1962 | Hedrick | 260—314 |
| 3,182,084 | 5/1965 | Wilson et al. | 260—294.7 |

WALTER A. MODANCE, *Primary Examiner.*

AVROM D. SPEVACK, *Assistant Examiner.*